(12) United States Patent
Krack et al.

(10) Patent No.: US 8,862,456 B2
(45) Date of Patent: Oct. 14, 2014

(54) SYSTEM AND METHOD FOR AUTOMATIC LANGUAGE TRANSLATION FOR APPLICATIONS

(75) Inventors: Michael Krack, St. Pete Beach, FL (US); Jai Pugalia, San Jose, CA (US); Jeffrey Wong, San Jose, CA (US); Wayne Wong, Milpitas, CA (US)

(73) Assignee: Avaya Inc., Basking Ridge, NJ (US)

( * ) Notice: Subject to any disclaimer, the term of this patent is extended or adjusted under 35 U.S.C. 154(b) by 186 days.

(21) Appl. No.: 13/428,135

(22) Filed: Mar. 23, 2012

(65) Prior Publication Data

US 2013/0253901 A1    Sep. 26, 2013

(51) Int. Cl.
G06F 17/28    (2006.01)

(52) U.S. Cl.
CPC ..................... *G06F 17/28* (2013.01)
USPC .......................................................... 704/2

(58) Field of Classification Search
CPC ........................................... G06F 17/28
USPC .......................................................... 704/2
See application file for complete search history.

(56) References Cited

U.S. PATENT DOCUMENTS

| | | | |
|---|---|---|---|
| 6,928,648 B2 | 8/2005 | Wong et al. | |
| 7,539,619 B1 * | 5/2009 | Seligman et al. | 704/277 |
| 8,452,603 B1 * | 5/2013 | Liu et al. | 704/277 |
| 2005/0050548 A1 | 3/2005 | Sheinis et al. | |
| 2008/0077384 A1 | 3/2008 | Agapi et al. | |
| 2011/0167350 A1 * | 7/2011 | Hoellwarth | 715/727 |

FOREIGN PATENT DOCUMENTS

| | | |
|---|---|---|
| EP | 1 589 417 A2 | 10/2005 |
| WO | 97/29433 A1 | 8/1997 |

* cited by examiner

*Primary Examiner* — Susan McFadden
(74) *Attorney, Agent, or Firm* — Maldjian Law Group LLC; John Maldjian; Alexander D. Walter

(57) ABSTRACT

System and method to translate displayed text of a computer application, the method including: intercepting a command to display text in a first language, the command comprising the text to display in the first language; extracting text to translate from the command; querying a translation mechanism by use of the extracted text; receiving translated text in a second language from the translation mechanism; and displaying the translated text in the second language.

19 Claims, 8 Drawing Sheets

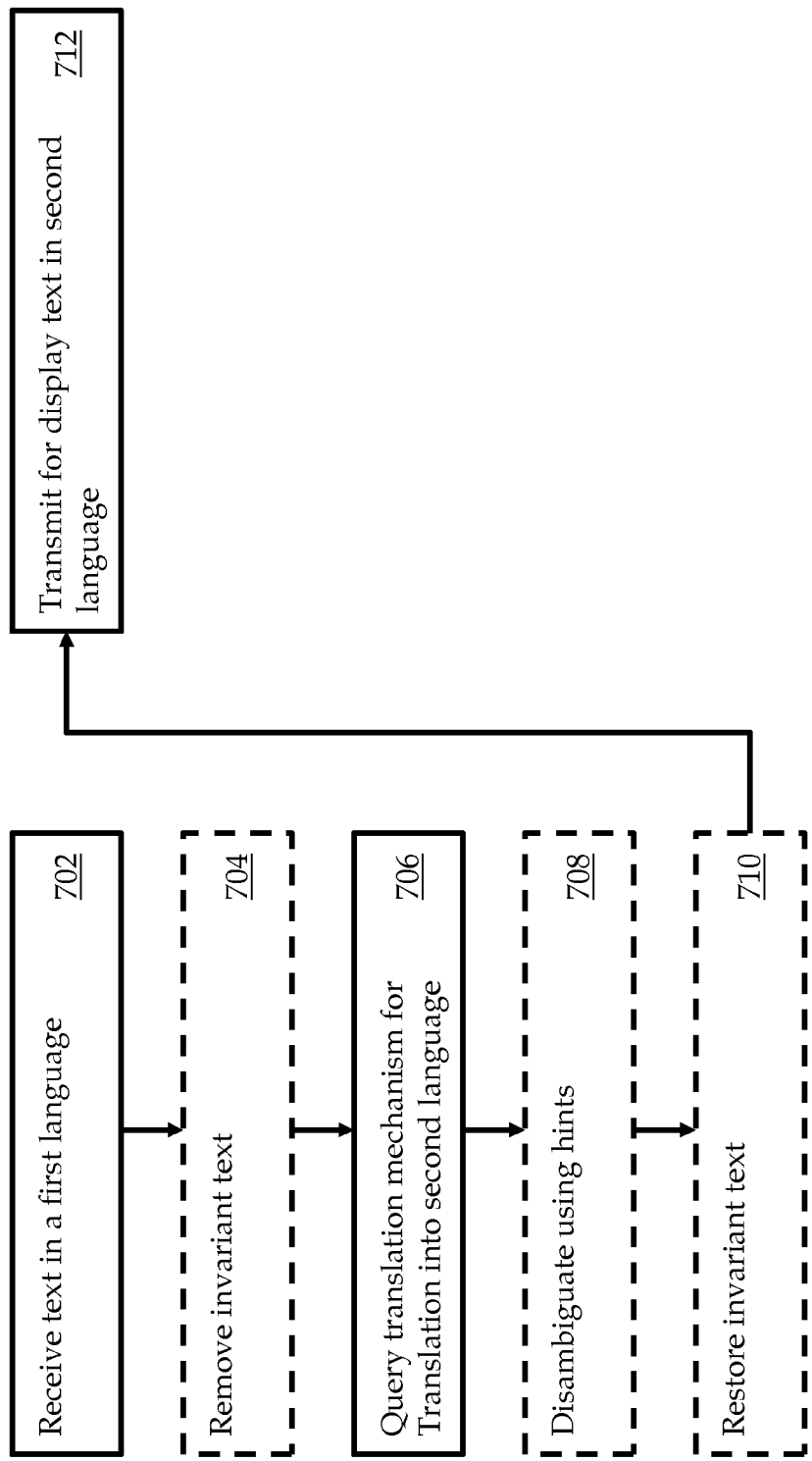

FIG. 8    800

| 802 | 804 | 806 |
|---|---|---|
| 1 | Click here | Cliquez ici |
| 2 | Confirm | Confirmer |
| 3 | Edit | éditer |
| 4 | File | Fichier |
| 5 | Fly | Mouche |
| 6 | Help | D'aide |
| 7 | No | Non |
| 8 | Open | Ouvert |
| 9 | Options | Options |
| 10 | Press ENTER to continue | appuyez sur ENTER pour continuer |
| 11 | Tool | Outil |
| 12 | Yes | Oui |

SYSTEM AND METHOD FOR AUTOMATIC LANGUAGE TRANSLATION FOR APPLICATIONS

BACKGROUND

1. Field of the Invention

Embodiments of the present invention generally relate to internationalizing software applications, and, in particular, to a system and method for providing on the fly translations of user-interface text into a foreign language without access to source code.

2. Description of Related Art

Known systems and methods for internationalizing software applications include providing international versions of software and/or pre-defined sets of user interface messages in select foreign languages, but these choices are generally limited in what is allowed. Additional effort and access to source code may be needed in order to internationalize less popular user applications, leading to inefficiencies and increased costs. The customer's perception of applications with limited language support may negatively affect their satisfaction with the user application.

Connected, shared and personalized information devices such as smart phones, two-way pagers, personal organizers, internet TVs, tablet PCs, etc., are becoming increasingly important to consumers. Many software applications (i.e., "apps") for such information devices were not designed with internationalization in mind and as such will generate a user interface in only one language.

Internationalization techniques known in the art generally involve modifying computer source code of an application to support mapping of text data into other languages via language-specific property files. For example, an English text phrase may be identified by a unique identifier ("ID"), and this ID then becomes a lookup key into a language specific property file to find the corresponding phrase in the new language. This internationalization technique requires the following steps:

First, accessing computer source code of an application, which may not be readily available, especially for third party components;

Second, making changes to computer source code of an application to support mapping of text data into other languages via language specific property files or APIs; and Third, requiring creation of property files to perform the mapping of text data into a specific language. A specific property file must be created for each language which means a fixed set of languages is supported and additional work must be performed to support additional languages.

On-the-fly language translation using a JavaScript API and an internet-accessible translation server is available, but such a solution requires an active internet connection while running the JavaScript API, and it requires that a developer alter the computer source code of an application to be translated, in order to pass each phrase or sentence requiring translation to the translation server.

For the reasons described above, modifying computer source code of an application to support multiple languages is often a costly, labor-intensive and error prone activity. End users who own such an application are unable to localize the user interface into their preferred language. In the case of free applications for information devices, the revenue is often too small to generate any interest for the developer to invest the time to support multiple languages.

However, these information devices may be customizable by allowing users to download new services and applications from the Internet. Therefore, a need exists for an application to run on information devices in order to provide a customizable user interface in the consumer's preferred language, and ultimately improved customer satisfaction with their information device.

SUMMARY

Embodiments of the present invention generally relate to internationalizing software applications, and, in particular, to a system and method for providing on the fly translations of user-interface text into a foreign language without access to source code, by use of middleware that intercepts and translates textual messages in Java or similar languages.

In one embodiment, a method to translate displayed text of a computer application includes: intercepting a command to display text in a first language, the command comprising the text to display in the first language; extracting text to translate from the command; querying a translation mechanism by use of the extracted text; receiving translated text in a second language from the translation mechanism; and displaying the translated text in the second language.

In one embodiment, a system to translate displayed text of a computer application includes: an interception module configured to intercept a command to display text in a first language, the command comprising the text to display in the first language; an extraction module configured to extract text to translate from the command; an interface to a translation mechanism, wherein the interface is configured to transmit extracted text to the translation mechanism, and to receive translated text from the translation mechanism; and an output module configured to display the translated text in the second language.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein:

FIG. 7 illustrates at a lower level of abstraction a method to convert text from a first language to a second language, in accordance with an embodiment of the present invention; and FIG. 8 illustrates a sample lookup table in accordance with an embodiment of the present invention.

Figure 1:
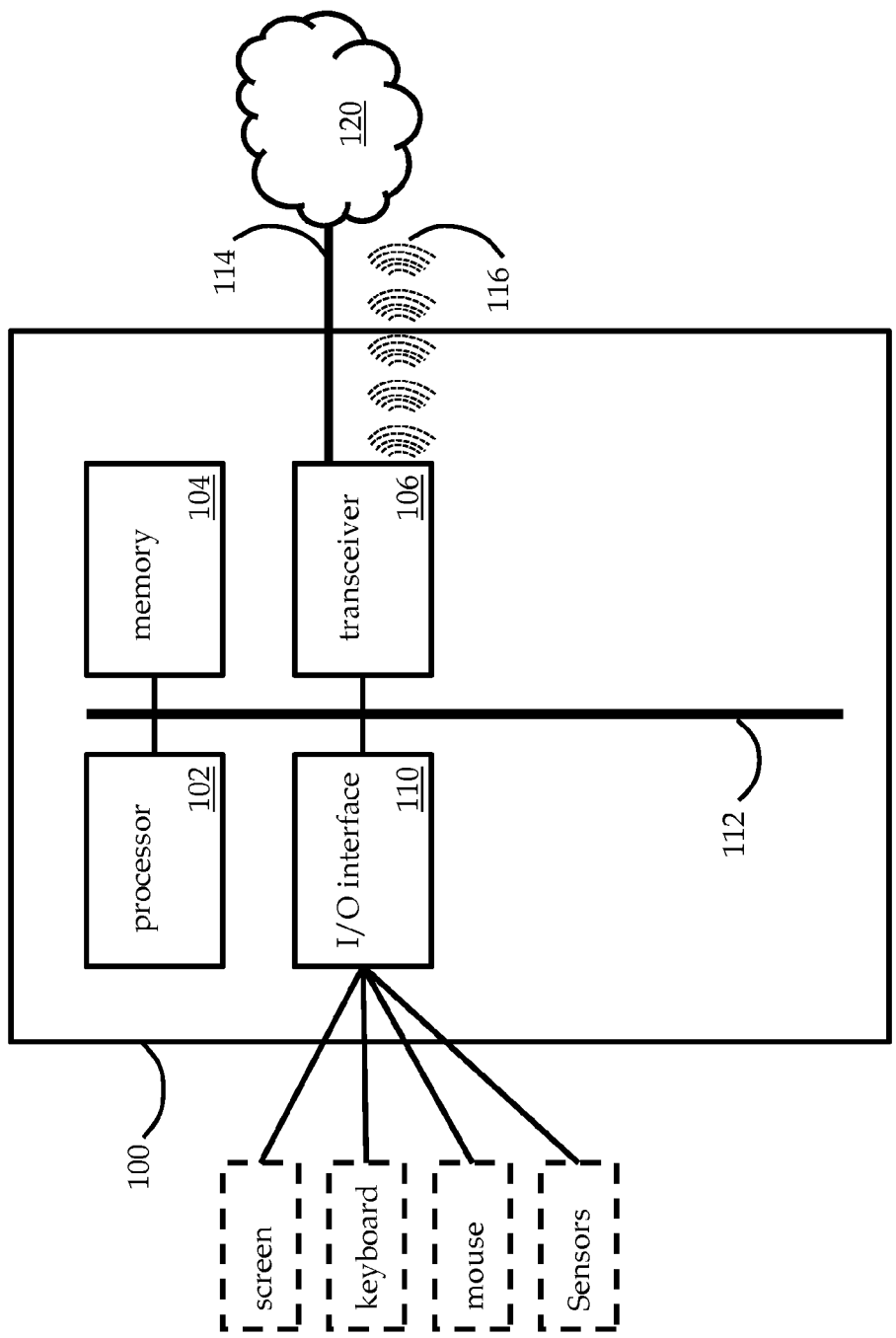
FIG. 1 illustrates at a high level of abstraction an information device to provide a customizable user interface, in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As described herein, embodiments in accordance with the present invention may provide automatic translation of substantially all user-interface text for a user application running on a user's information device, without modification to the original source code for the user application. Translating the user-interface text of the user application may be performed outside the application by a translation process incorporated within a common Java virtual machine ("JVM") layer, or may be performed by a translation process incorporated within the operating system. The translation process may also include a separate application outside JVM or OS, or may also include a cloud-based translation service (i.e., a translation webservice). Applications running on the system are unaware of these changes and need not be modified. This is in contrast to current methods where the application itself is modified, resulting in costly, labor-intensive and error prone activities. Embodiments in accordance with the present invention do not incur time-to-market delays as a result of supporting additional languages because the application need not be modified.

Java, originally developed by Sun Microsystems, is an object-oriented, multithreaded, portable, platform-independent, secure programming environment used to develop, test and maintain software programs. Java programs have found extensive use on the World Wide Web, which is the Internet's multimedia information retrieval system. These programs include full-featured interactive, standalone applications, as well as smaller programs, known as applets, that run in a Java-enabled Web browser or applet viewer.

Java is an interpreted language. The source code of a Java program is compiled into an intermediate language called bytecode. The bytecode is then converted (interpreted) into machine code at runtime. Upon finding a Java applet, the Web browser invokes a Java interpreter (Java Virtual Machine, or "JVM"), which translates the bytecode into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Depending on the targeted computing platform, Sun has grouped the Java technologies into three editions: Java 2 Micro Edition (J2ME), Java 2 Standard Edition (J2SE) and Java 2 Enterprise Edition (J2EE). Each of these editions has been customized specifically for the platform it is targeting, e.g., a portable consumer information device, a desktop computer or an enterprise network server.

In particular, J2ME is better suited for portable consumer information devices, compared to the other Java editions. J2ME includes technology, APIs, tools and standards needed to create applications for such information devices. J2ME may be used to create dynamically extensible, networked products and applications for information devices.

For users' information devices, J2ME supports minimal configurations that can be extended with new APIs and virtual machines ("VMs") as new features are added to these devices and new applications are developed for them by third parties.

Although embodiments of the present invention may be described based on the Java programming language, other programming languages may be used, such as .Net or other object oriented programming languages, or a JVM from another vendor such as Google. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

Middleware is software that, invisibly to the user, takes two or more different applications and makes them work seamlessly together. To accomplish this, middleware is placed between layers of software to make the layers below and on the sides work with each other. The Android environment provides a middleware layer including libraries and services to facilitate the development of performance-sensitive or device-specific functionality, such as data storage, screen display, multimedia, and web browsing.

Embodiments in accordance with the present invention provide a customizable user interface in the consumer's preferred language by customizing the user's information device to add a middleware layer, or add additional functionality to an existing middleware layer, that intercepts textual display-related calls, functions or events, and translates the text into a user's preferred language for display. Such text may include menu lists, dialog boxes, prompts, screen displays, help files, popups, and so forth.

For information devices executing Java applications (e.g., all information devices running Android applications), embodiments in accordance with the present invention modify a Java Virtual Machine layer by intercepting calls to the display output methods, translating text strings (e.g., user-interface text) supplied in the calls into a second language, then completing the calls to the display output methods using the second language.

For example, in Java the SetText method of the java.awt.TextComponent class is one method which supplies a text string that could be used to perform this type of automatic translation. The SetText method sets the text, as presented by the text component of this method, to be the text so specified.

Embodiments in accordance with the present invention may be implemented as a translation application program ("app") that resides in the JVM layer. The translation app may be built into the JVM layer, or it may be added later to the JVM layer, e.g., by way of an installation program. The translation app may be configured to translate from a selected original source language into one or more selected desired languages. The translation app may be configured to prompt the user for the original source language and the desired destination language. The middleware layer may be configured to save this choice for future translations.

The translation itself may be performed by a translation mechanism, such as a cloud-based translation service. One cloud-based translation service is the Google Translation API, which takes a text string (e.g., a sentence or phrase) in the original source language, and an indication of the desired destination language, and returns a result in the desired destination language. In some embodiments in accordance with the present invention, the translation may be supplemented by a lookup table, cache memory, or the like, for commonly translated words (e.g., "File", "Open", etc.) or for words that had recently been translated.

Many words are capable of alternate meanings, depending upon context. In order to disambiguate these alternate meanings, embodiments in accordance with the present invention may be configured to include a hints database in the translation app. The hints database may provide identification of preferred meanings, definitions, translations and the like for a word, based upon the context of the word. The hints database may be local to the user's device or may be located remotely. The location would be specified via the configuration app. A remote hints database may be read-only and may be used by a plurality of users. For example, the vendor of the Angry Birds app may decide to provide a public hints database on their web site. Hints may be provided to the translation mechanism prior to receiving the translated text, in order to assist the translation mechanism in selecting from among alternate translations. Alternatively, the translation mechanism may be configured to return multiple alternate translations, and the hints may be used within the JVM to select from among the alternate translations.

A translation process in accordance with an embodiment of the present invention may be able to support application-specific extensions or logic which apps can be configured to use. For example, for an app about insects, the developer may create and register a property file or something to disambiguate instances of the word "fly" to refer to the insect and not the act of flying through air. Because this property file and/or language module would be independent of the binary or source code, this application-specific capability would allow application-specific or context-specific translations without a need to recompile or having access to the original source code.

In order to disambiguate alternate meanings of words, embodiments in accordance with the present invention may also provide a preview mode that is configured to present the user with a text string and allows the user to accept the default translation or to select an alternate translation of the text string.

A translation process in accordance with an embodiment of the invention may be applied to an entire phrase, sentence, an entire row or complete label of the user application on the screen, or similar multi-word textual sample. The translation process may also be applied to individual words. Examples of Java textual display-related calls, functions or events that may be used include a Java setText command, a Java API method called java.awt.Button.setLabel, a Java API method called java.awt.Dialog.setTitle, a Java SetText method of the java.awt.TextComponent, and so forth. For example, Java API method setLabel must receive an entire label associated with a button as any successive calls to this method would overwrite the previous label. Similarly, setTitle does not support appending text and the method must be called with a complete title of the window or dialog box.

Language translation between substantially any pair of source and target languages may be accommodated by an appropriate translation table or must be supported by the black box cloud translation service. Language translation between languages of disparate character sets (e.g., English to Greek, Russian, Chinese, Hebrew, Arabic, etc.) can be accommodated by use of an appropriate font, e.g., a Unicode font that includes characters from the target language.

Real-time translation in accordance with an embodiment of the present invention may slightly alter the "look-and-feel" of the user interface, at least because the length of the translated text is different than the length of the untranslated text. However, most Java applications take advantage of the layout manager which best fits the supplied text to the available space. In most cases, any shorter or longer strings should be well accommodated by adjusting the display (e.g., the spacing and/or placement) of the translated text. Embodiments in accordance with the present invention will be able to provide an acceptable translation layout for a vast number of Android or Java based apps. Even if the target language is customarily written in a different direction, such as right to left (e.g., Hebrew, Arabic), or up and down (e.g., Chinese), the translated string will be accurate. The layout and presentation may not be ideal for some target languages but will improve if the end user optimizes the operating system locale settings for the target language, e.g., changes the default font to be Unicode, etc.

At least a portion of the text substitution may also be accomplished by a hybrid process. For example, if derivative words such as words in plural form or words in past tense need to be translated, the hybrid process may use a first process to translate a root form of the word, and then a second process may change the translated root form of the word into the plural or the past tense form, and so forth, as required. The second process may involve relatively simple rules (e.g., in English, adding "s" or "es" to form plural forms), or may involve a second process for modifying the root form of the translated word.

Not every word or phrase from the source language will need translation. For example, numbers, acronyms, proper names, etc. are exceptions that do not need translation. These exceptions may be referred to herein as invariant words. Such invariant words may be handled in at least two ways. First, the word or phrase may be passed to a translation process as usual. The translation process may recognize the invariant word, which will then be returned as an untranslated exception, i.e., the invariant word. Second, the JVM may recognize the invariant word in advance as being an invariant word, so that no query is made to the translation process using the invariant word.

If the text string has both an invariant word portion and a non-invariant word portion, the app may parse the text string to separate out the invariant words that do not need translation, then perform the translation process for the remaining words or phrases to translate. The app will take care of reinserting the invariant words into the proper location in the translated phrases.

In some situations, a proper name that should not be translated includes regular words that would otherwise be translated. For example, an address in a dialog box might be "123 Yellow Brick Road", which should not be translated. Embodiments in accordance with the present invention may provide in the hints mechanism this type of customization. For example, the hints database may can designate that a text string is a verb or noun or whether it should not be translated. Field-specific hints may be provided for specific text labels or specific text values that are associated with the label, such as field-specific hints tailored for address.

For non Java-based applications running on a message/event based operating system (such as Microsoft Windows), embodiments in accordance with the present invention use the same method at an operating system level. For example, all windows-based apps are event driven and they do not make explicit function calls in order to obtain an input. Instead, such apps wait for the system to pass an input to them via a message. A translation process in accordance with an embodiment of the invention may intercept these messages and perform the translation. The result of such an interception is an automatic translation of user-interface text without modification to the original source code.

FIG. 1 illustrates at a high level of abstraction a mobile information device 100 implementing a customizable user interface in the consumer's preferred language, in accordance with an embodiment of the invention. Mobile information device 100 may include a processor 102, a memory 104 coupled to processor 102, a receiver, transmitter, transceiver 106, and/or I/O interfaces 110. Transceiver 106 couples mobile information device 100 to an internal and/or external communication path such as an Ethernet connection 114 or an optional RF connection 116. RF connection 116 may be WiFi, Bluetooth, ZigBee, UWB, or similar technologies used for RF networking. I/O interfaces 110 couple mobile information device 100 to one or more optional user input/output (I/O) devices (e.g., display screen, keyboard, mouse, etc.). One or more of I/O devices may be integrated as part of mobile information device 100, or may be physically separate. Memory 104 stores data and/or program instructions used by processor 102. Memory 104 may include permanent, non-volatile memory (e.g., ROM), or volatile memory (e.g., RAM), or rewritable memory (e.g., hard drive or flash memory), or any combination thereof. For instance, memory 104 may store program instructions and associated data. Components of mobile information device 100 may be interconnected by communication path 112. The program instructions, when executed by processor 102, carry out the processes performed by mobile information device 100.

Mobile information device 100 may communicate via Ethernet connection 114 and/or RF connection 116 to a wide area network 120 ("WAN") such as the Internet, which in turn connects with one or more external networking sites (not shown in FIG. 1).

Figure 2:
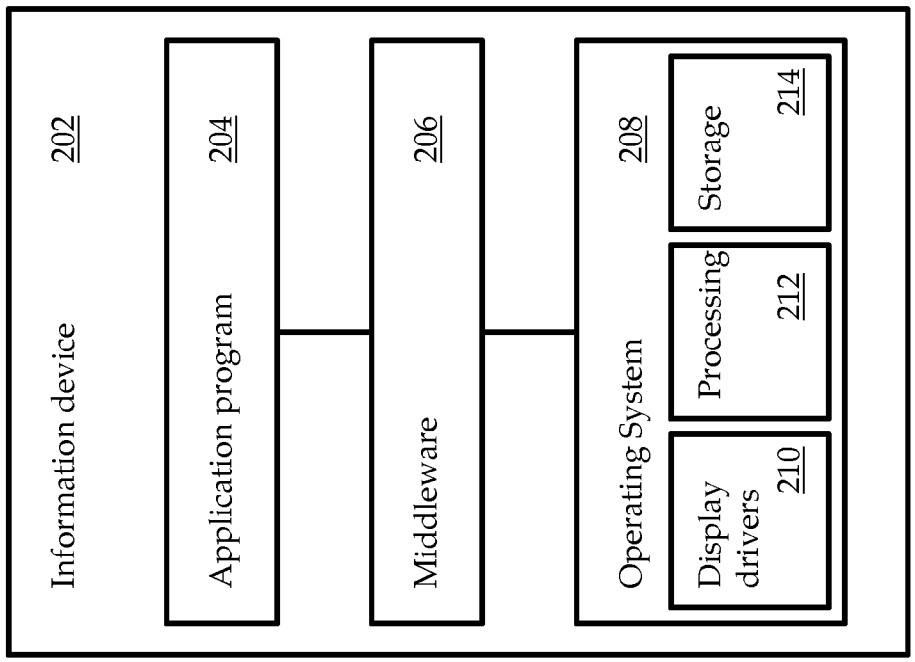
FIG. 2 illustrates at a high level of abstraction a software architecture of an information device to provide a customizable user interface, in accordance with an embodiment of the present invention.

FIG. 2 illustrates at a high level of abstraction a software architecture for a mobile information device 202 implementing a customizable user interface in the consumer's preferred language, in accordance with an embodiment of the invention. At the highest level is one or more application programs 204, for example a web browser, Skype, etc. At the lowest level is an operating system 208, which may include display drivers 210, processing module 212, and storage 214. In the middle is middleware 206, providing an interface between application programs 204 above and operating system 208 below.

Middleware is software designed to help manage the complexity and heterogeneity inherent in distributed systems. Middleware is situated at a layer of software above the operating system but below the application program that provides a common programming abstraction. Middleware provides a higher-level building block for programmers than Application Programming Interfaces (APIs) such as sockets that are provided by the operating system. This significantly reduces the burden on application programmers by relieving them of this kind of tedious and error-prone programming. Middleware is sometimes informally called "plumbing" because it connects parts of a distributed application with data pipes and then passes data between them.

Figure 3:
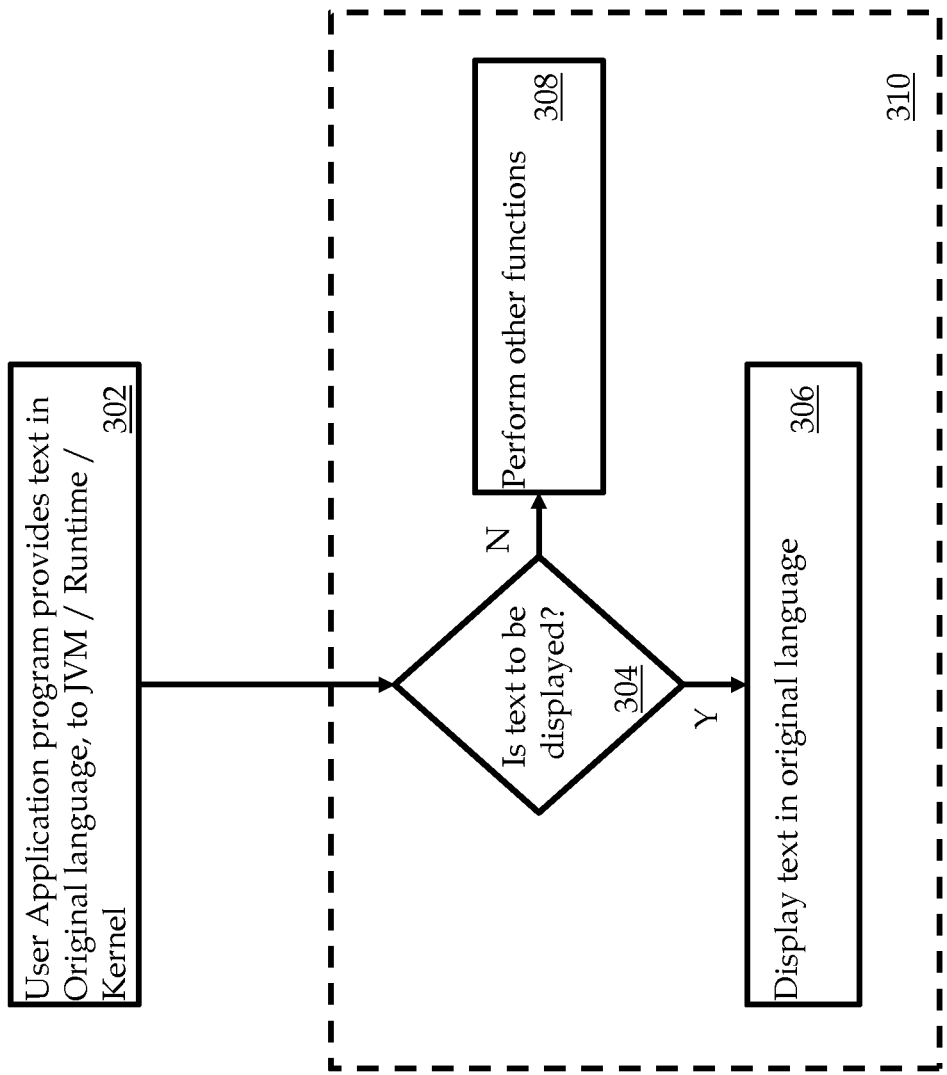
FIG. 3 illustrates at a high level of abstraction a method to display text on an information device without language translation, as known in the background art.

FIG. 3 illustrates at a high level of abstraction a method 300 of the known art for displaying text on a mobile information device. Method 300 begins at step 302, at which a user application program provides some text in an original source language. The user application program supplies the text to a middleware layer 310 of software running in the mobile information device. The middleware layer 310 may be a java virtual machine, a common language runtime module, a kernel layer, or the like.

At step 304, the middleware layer 310 determines whether the text from step 302 needs to be displayed. If the text from step 302 does need to be displayed, it is displayed in its original source language at step 306. If the result of step 304 is that the text from step 302 does not need to be displayed, then control passes to step 308 at which the mobile information device is able to perform other functions.

Figure 4:
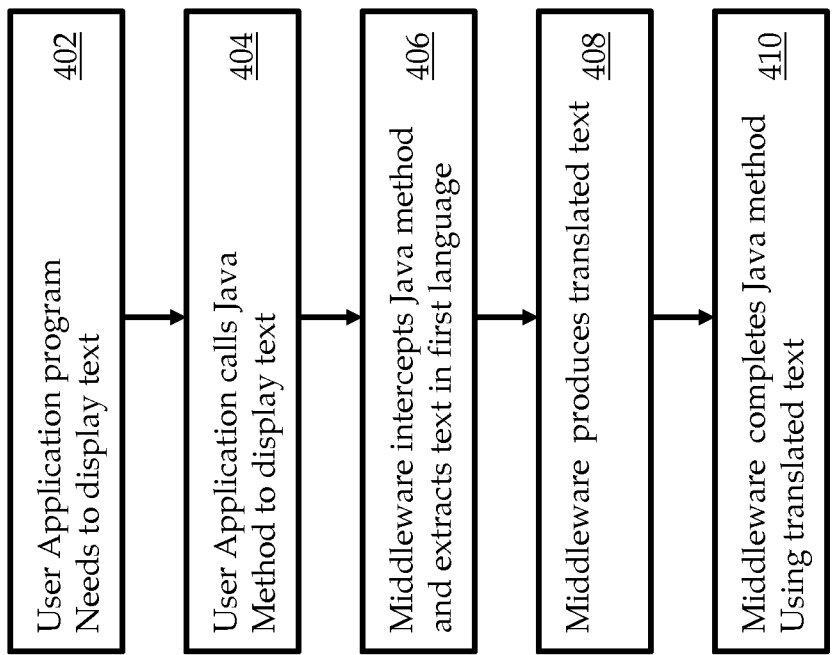
FIG. 4 illustrates at a high level of abstraction a method to translate user interface text from a first language to a second language, in accordance with an embodiment of the present invention.

FIG. 4 illustrates at a high level of abstraction a method 400 for mobile information device 202 to implement a customizable user interface in the consumer's preferred language, in accordance with an embodiment of the invention.

At step 402, an application program has a need to display some text to a user.

At step 404, the application program makes calls to Java methods (or other software system as described herein) in order to display the text.

At step 406, middleware in accordance with an embodiment of the invention intercepts the calls to Java methods referenced at step 404, and extracts the text. As described herein, some of the text may not need to be translated, so there may be a further extraction of just the text needing translation.

At step 408, middleware in accordance with an embodiment of the invention produces translated text. The process may involve a lookup table to translate from a first language to a second language, or may involve usage of cloud-based translation services. Optionally, a hybrid approach using both the lookup table and the cloud-based translation services may be used.

At step 410, the translated text in the second language is displayed by use of java methods (or other software system as described herein) in order to display the text.

Figure 5:
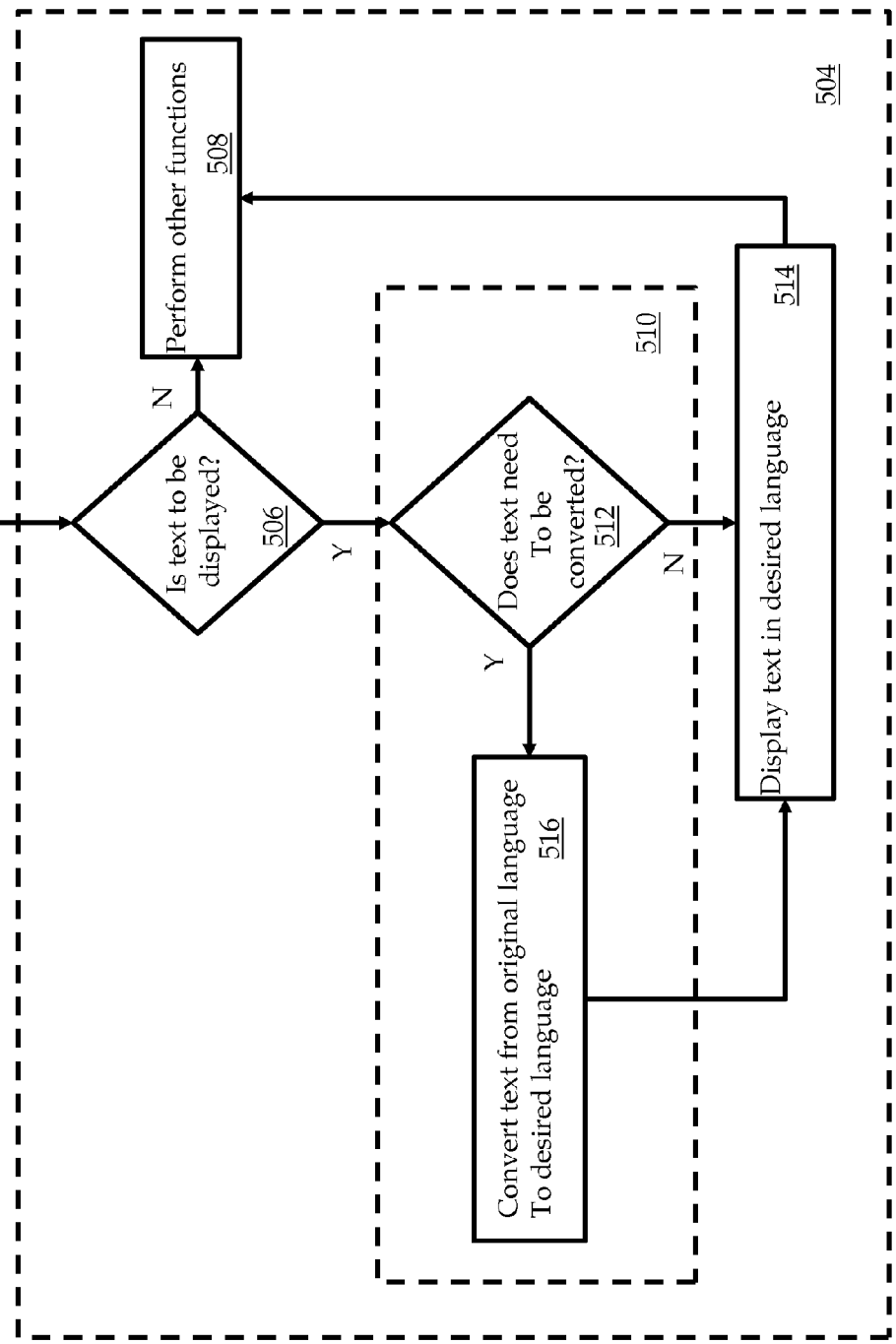
FIG. 5 illustrates at a lower level of abstraction a method to translate user interface text from a first language to a second language, in accordance with an embodiment of the invention.

FIG. 5 illustrates at a lower level of abstraction a method 500 for mobile information device 202 to implement a customizable user interface in the consumer's preferred language, by translating from an original language to a desired language, in accordance with an embodiment of the invention.

Method 500 begins at step 502, at which a user application program provides some text in an original source language. The user application program supplies the text in the original source language to a middleware layer 504 of software running in the mobile information device. The middleware layer 504 may be a java virtual machine, a common language runtime module, a kernel layer, or the like.

At step 506, the middleware layer 504 determines whether the text from step 502 in the original source language needs to be displayed. If the text from step 502 does not need to be displayed, then control passes to step 508 at which the mobile information device is able to perform other functions. If the result of step 506 is that the text from step 502 in the original source language does need to be displayed, control passes to automatic language translator 510.

Text supplied by step 506 to the automatic language translator 510 is processed at step 512 to determine whether or not the text has to be translated to a desired language that is different than the original source language. If the result of step 512 is negative (i.e., the original source language is the same as the desired language), then control passes to step 514 at which the text is displayed in the desired language.

However, if the result of step 512 is positive (i.e., the original source language is different than the desired language), then control passes to step 516 at which the text is converted to the desired language (so long as the desired language is a supported language). Control then passes to step 514 at which the text is displayed in the desired language. At the conclusion of step 514, control passes to step 508, at which the mobile information device 202 is able to perform other functions.

Figure 6:
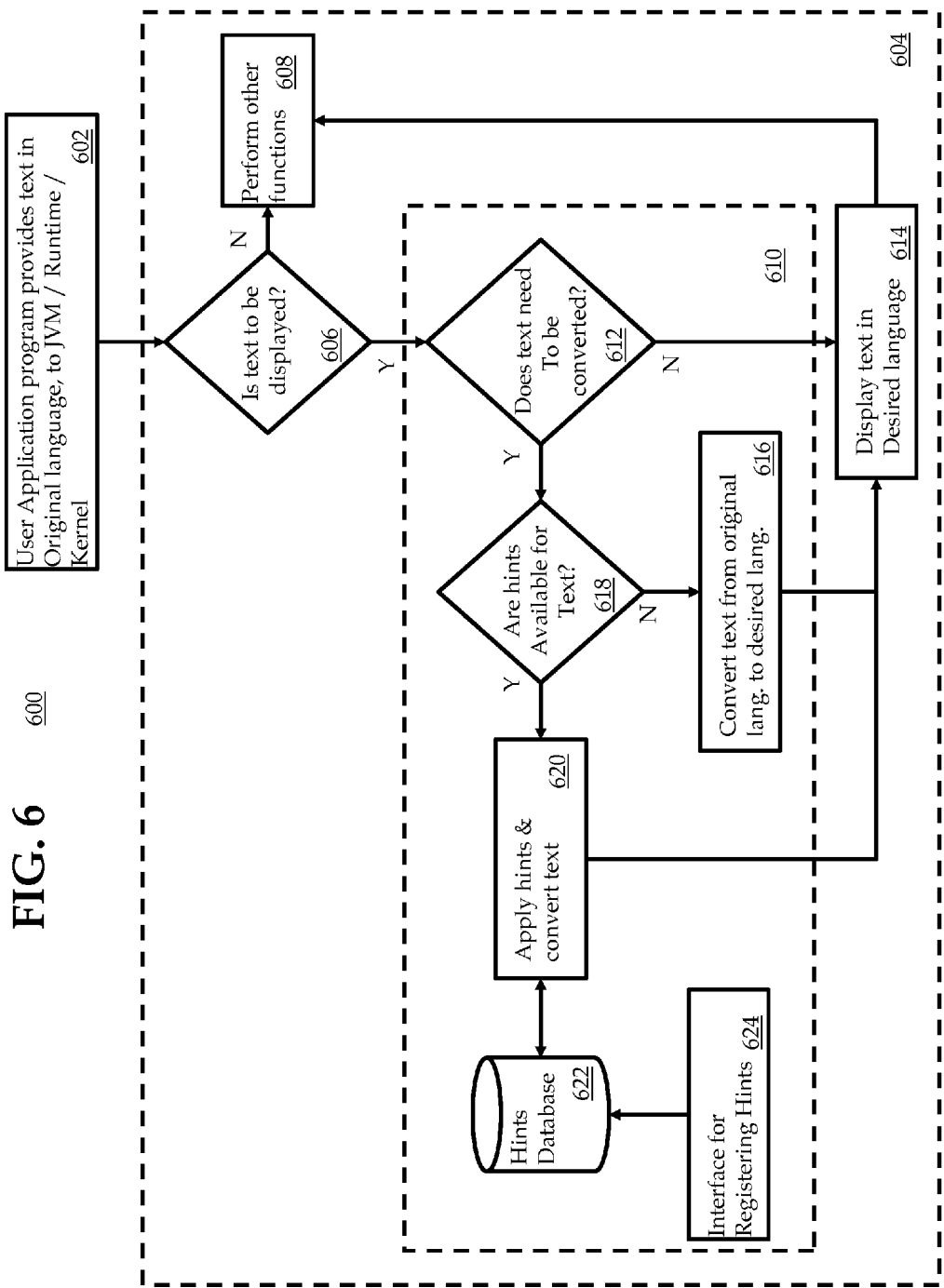
FIG. 6 illustrates at a low level of abstraction a method to translate user interface text from a first language to a second language, in accordance with an embodiment of the invention, using hints to improve the accuracy of the translation, in accordance with an embodiment of the invention.

FIG. 6 illustrates at a lower level of abstraction a method 600 for mobile information device 202 to implement a customizable user interface in the consumer's preferred language, by translating from an original language to a desired language, using hints to improve the accuracy of the translation, in accordance with an embodiment of the invention.

Method 600 begins at step 602, at which a user application program provides some text in an original source language. The user application program supplies the text in the original source language to a middleware layer 604 of software running in the mobile information device. The middleware layer 604 may be a java virtual machine, a common language runtime module, a kernel layer, or the like.

At step 606, the middleware layer 604 determines whether the text from step 602 in the original source language needs to be displayed. If the text from step 602 does not need to be displayed, then control passes to step 608 at which the mobile information device is able to perform other functions. If the result of step 606 is that the text from step 602 in the original source language does need to be displayed, control passes to automatic language translator 610.

Text supplied by step 606 to the automatic language translator 610 is processed at step 612 to determine whether or not the text has to be translated to a desired language that is different than the original source language. If the result of step 612 is negative (i.e., the original source language is the same as the desired language), then control passes to step 614 at which the text is displayed in the desired language.

However, if the result of step 612 is positive (i.e., the original source language is different than the desired language), then control passes to step 618 to determine whether any hints are available for converting the text. If there are no hints available, the result of step 618 is negative and then control passes to step 616 at which the text is converted from its original language into the desired language (so long as the desired language is a supported language), without the usage of hints. Control then passes to step 614 at which the text is displayed in the desired language.

However, if the result of step 618 is positive (i.e., hints are available), then control passes to step 620 at which the text is converted from its original language into the desired language with the usage of hints. During the conversion, step 620 communicates with a hints database 622 in order to obtain hints and better disambiguate terms to translate. The hints database 622 may be configured, updated, changed, etc. as necessary through interface 624. For example, interface 624 may be used to customize or reconfigure hints database 622 based upon an identity or subject matter of the user application referenced in step 602.

When step 620 has finished converting the text from its original language into the desired language, control passes to step 614 in order to display the translated text. At the conclusion of step 614, control passes to step 608, at which the mobile information device 202 is able to perform other functions.

FIG. 7 illustrates at a high level of abstraction a method 700 for mobile information device 202 to implement a customizable user interface in the consumer's preferred language, in accordance with an embodiment of the invention. Method 700 may be usable, for instance, as at least part of step 616 and/or step 620 in method 600.

Method 700 begins at step 702 with the receipt of text in a first language. At optional step 704, invariant text may be removed from the received text. The invariant text may be, for example, acronyms and proper names. Whether or not to remove invariant text, and the type of invariant text which is searched for and removed, may depend at least in part on what the received text represents (e.g., a name, an address, etc.).

Next, at step 706, method 700 may query a translation mechanism to provide a translation service into a second language. The translation mechanism may be, for example, a cloud computing service accessible via Ethernet connection 114 or RF connection 116 that are depicted in FIG. 1.

In another embodiment in accordance with the present invention, the translation mechanism may be implemented at least in part by a lookup table. Such a lookup table may be useful when Internet access is not available, or as a cache memory for commonly used or recently used text strings such as "Yes", "No", "Accept", and so forth. Such a lookup table may reduce or eliminate latency associated with cloud computing. A hybrid approach may be used, wherein the lookup table is queried first, and if no match is found then a cloud-based translation mechanism may be utilized.

Next, at optional step 708, the translated text in the second language may be disambiguated in order to pick the best or mostly likely intended translation, from among more than one possible translation, for the context in which text was used or what the text represents. In some alternate embodiments, disambiguation may be performed prior to step 706 (i.e., a pre-query disambiguation) if for example a word or phrase in the first language may have several meanings each with a different translation into the second language.

A lookup table may also be useful during step 708, such that alternate translations in the second language may be temporarily stored until the disambiguation step 708 is able to determine the best translation from the context of usage.

Next, at step 710, any invariant text which had been removed at step 704 may be restored into the text in the second language.

At step 712, the text in the second language is transmitted to other modules and processes within mobile information device 202 for display to the user.

FIG. 8 illustrates an example of a lookup table 800 in accordance with an embodiment of the present invention, illustrating lookup-based translation from English to French. Each row of table 800 is a record, and each column of table 800 is a field. As illustrated, table 800 may be alphabetically sorted by field 804, which may useful for certain search processes. Field 802 is an optional field that may be used by some processes when searching for entries. Field 802 may be, for example, an index field, a hash value of the corresponding contents in field 804, and so forth. Field 804 is a word or phrase in the first language. Field 806 is a corresponding word or phrase in the second language. Table 800 has been adapted to support a user computer application (e.g., an application related to entomology) in which the word "fly" is more likely to appear in the context of an insect rather than in the context of flying through air, because the translation in field 806 refers to an insect. Table 800 may also be adapted to support a user computer application (e.g., Internet Explorer, Skype, etc.) by including words and phrases known from the computer application. Record number 10 of Table 800 illustrates invariant text "ENTER" which has not been replaced by the French translation "ENTRER" because in this context "ENTER" represents the proper name of a key on a computer keyboard. Table 800 may be extended to include support for a third foreign language (or more) by adding additional columns.

Embodiments of the present invention include a system having one or more processing units coupled to one or more memories. The one or more memories may be configured to store software and associated data, which when executed by the one or more processing unit, allows a user of an information device to translate user interface text of an application program from a first language into a second language, without modifying the application program and without requiring access to the source code of the application program, at least by use of processes described above in the Figures and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method to translate displayed user-interface text of a computer application, comprising:
   intercepting, by a processor coupled to a memory and a screen, a command to display user-interface text on the screen in a first language, the command comprising the user-interface text to display in the first language;
   extracting user-interface text to translate from the command;
   querying a translation mechanism by use of the extracted user-interface text;
   receiving translated user-interface text in a second language from the translation mechanism; and
   displaying the translated user-interface text in the second language.

2. The method of claim 1, wherein the translation mechanism is adapted to the computer application.

3. The method of claim 1, wherein searching for the user-interface text to translate comprises searching for a multi-word textual phrase in the translation mechanism.

4. The method of claim 1, wherein the steps of:
   receiving translated user-interface text in a second language from the translation mechanism; and
   displaying the translated user-interface text in the second language, comprise the steps of:
      receiving returned translated user-interface text in a second language from the translation mechanism;
      selecting a portion of the returned translated user-interface text, by use of a hint, to produce displayable translated user-interface text; and
      displaying the displayable translated user-interface text in the second language.

5. The method of claim 1, further comprising:
   adjusting a tense and a plural form of the user-interface text in the second language to be equal to a tense and a plural form of the user-interface text in the first language.

6. The method of claim 1, further comprising:
   removing invariant words from the user-interface text to translate; and
   reinserting the invariant words into the translated user-interface text in the second language.

7. The method of claim 1, further comprising: adjusting a display of the translated user-interface text in the second language.

8. The method of claim 1, wherein returning translated user-interface text in a second language from the translation mechanism comprises:
   if the user-interface text to translate is present in the translation mechanism, returning the translated user-interface text; and
   if the user-interface text to translate is not present in the translation mechanism, returning the user-interface text to translate.

9. The method of claim 1, wherein a value derived from the user-interface text to translate is used to search in the translation mechanism.

10. The method of claim 1, wherein the translation mechanism comprises a second supported foreign language.

11. A system to translate displayed user-interface text of a computer application, comprising:
- an interception module configured to intercept a command to display user-interface text in a first language, the command comprising the user-interface text to display in the first language;
- an extraction module configured to extract user-interface text to translate from the command;
- an interface to a translation mechanism, wherein the interface is configured to transmit extracted user-interface text to the translation mechanism, and to receive translated user-interface text from the translation mechanism; and
- an output module configured to display the translated user-interface text in the second language.

12. The system of claim 11, wherein the translation mechanism is adapted to the computer application.

13. The system of claim 11, wherein the translation mechanism is configured to translate a multi-word textual phrase.

14. The system of claim 11, wherein the translation mechanism is configured to translate by use of a hash value.

15. The system of claim 11, further comprising:
- an adjustment module configured to adjust a tense and a plural form of the user-interface text in the second language to be equal to a tense and a plural form of the user-interface text in the first language.

16. The system of claim 11, wherein:
- the extraction module is further configured to remove invariant words from the user-interface text to translate; and
- the output module is further configured to reinsert the invariant words into the translated user-interface text in the second language.

17. The system of claim 11, wherein the output module is further configured to adjust a display of the translated user-interface text in the second language.

18. The system of claim 11, wherein the translation mechanism is configured to use a value derived from the user-interface text to translate.

19. The system of claim 11, wherein the translation mechanism is configured to support a third language.

* * * * *